United States Patent
Hu et al.

(10) Patent No.: US 12,480,808 B2
(45) Date of Patent: Nov. 25, 2025

(54) LASER FREQUENCY DRIFT COMPENSATION IN FORWARD DISTRIBUTED ACOUSTIC SENSING

(71) Applicant: NEC Laboratories America, Inc., Princeton, NJ (US)

(72) Inventors: Junqiang Hu, Davis, CA (US); Yue-Kai Huang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 106 days.

(21) Appl. No.: 18/417,798

(22) Filed: Jan. 19, 2024

(65) Prior Publication Data

US 2024/0247974 A1    Jul. 25, 2024

Related U.S. Application Data

(60) Provisional application No. 63/480,549, filed on Jan. 19, 2023.

(51) Int. Cl.
*G01H 9/00*    (2006.01)
*G01D 5/353*    (2006.01)

(52) U.S. Cl.
CPC ......... *G01H 9/004* (2013.01); *G01D 5/35361* (2013.01)

(58) Field of Classification Search
CPC .................. G01H 9/004; G01D 5/35361
See application file for complete search history.

(56) References Cited

U.S. PATENT DOCUMENTS

| | | | |
|---|---|---|---|
| 2020/0249076 A1* | 8/2020 | Ip | G01H 9/004 |
| 2022/0116121 A1* | 4/2022 | Ogasahara | H04B 10/6165 |
| 2022/0236083 A1* | 7/2022 | Ip | G01D 5/35361 |
| 2023/0073827 A1* | 3/2023 | Russell | G01D 5/35358 |

FOREIGN PATENT DOCUMENTS

CN          112729353 A *    4/2021    ............. G01D 5/266

\* cited by examiner

*Primary Examiner* — Dominic J Bologna
(74) *Attorney, Agent, or Firm* — Vincent Duffy; Joseph Kolodka (57) ABSTRACT

Disclosed is a forward phase method using regular narrow line width CW laser, to cover the acoustic band with reduced processing speed, while tolerant laser frequency drift. A narrow linewidth CW laser is used to launch its power into an optical fiber at a transmitter side. At a receiver side, another narrow linewidth CW laser is used to coherently detect the received signal. The detected signal, which includes both X and Y polarizations, each having in-phase and quadrature to represent a "complex" channel, are connected to an ADC's inputs. Signal processing following the ADC inputs and extracts the phase change of the acoustic band.

5 Claims, 11 Drawing Sheets

FIG. 1(A)

Prior Art

FIG. 1(B)

Prior Art

Fig. 8 phase tracking circuit

LASER FREQUENCY DRIFT COMPENSATION IN FORWARD DISTRIBUTED ACOUSTIC SENSING

CROSS-REFERENCE TO RELATED APPLICATIONS

This application claims the benefit of U.S. Provisional Patent Application Ser. No. 63/480,549 filed Jan. 19, 2023, the entire contents of which is incorporated by reference as if set forth at length herein.

FIELD OF THE INVENTION

This application relates generally to distributed acoustic sensing (DAS) systems, methods, structures, and related technologies. More particularly, it pertains to laser frequency drift compensation in forward distributed DAS.

BACKGROUND OF THE INVENTION

Forward methods to detect accumulated phase change along the length of an optical fiber have long been of interest to telecommunications and optical sensor technologists, that interest producing numerous applications. In one such application, a transmitter launches unmodulated signals from a continuous wave (CW) laser into an optical fiber, while a coherent receiver extracts any optical phase change. Such phase change reflects accumulated activity along the length of the entire optical fiber between the transmitter and receiver and was initially proposed for seismic wave detection using submarine cables, as part of research of underwater earthquakes, which requires sub-Hertz detection capabilities. As was realized, laser phase noise is reflected in the extracted signal, making it difficult to differentiate from environmental disturbance.

SUMMARY OF THE INVENTION

An advance in the art is made according to aspects of the present disclosure directed to a forward phase method using regular narrow line width CW laser, to cover the acoustic band with reduced processing speed, while tolerant laser frequency drift. According to aspects of the present disclosure, a narrow linewidth CW laser is used to launch its power into an optical fiber at a transmitter side. At a receiver side, another narrow linewidth CW laser is used to coherently detect the received signal. The detected signal, which includes both X and Y polarizations, each having in-phase and quadrature to represent a "complex" channel, are connected to an ADC's inputs. Signal processing following the ADC inputs, extracts the phase change of the acoustic band.

In sharp contrast to the prior art, our inventive systems and methods employ circuitry configured to perform a phase difference averaging to track the low-speed frequency drift. This averaged value is fed into another stage, which has a pre-set fixed step. This other, second stage uses the phase from the sum of the pre-set value and the value outputted from the first stage, to generate the frequency-shift carrier signal and convert the input to a lower frequency. The adjustment from the first stage contains the laser frequency drift, so at the second stage output, the laser drift is eliminated.

DETAILED DESCRIPTION OF THE INVENTION

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1A:
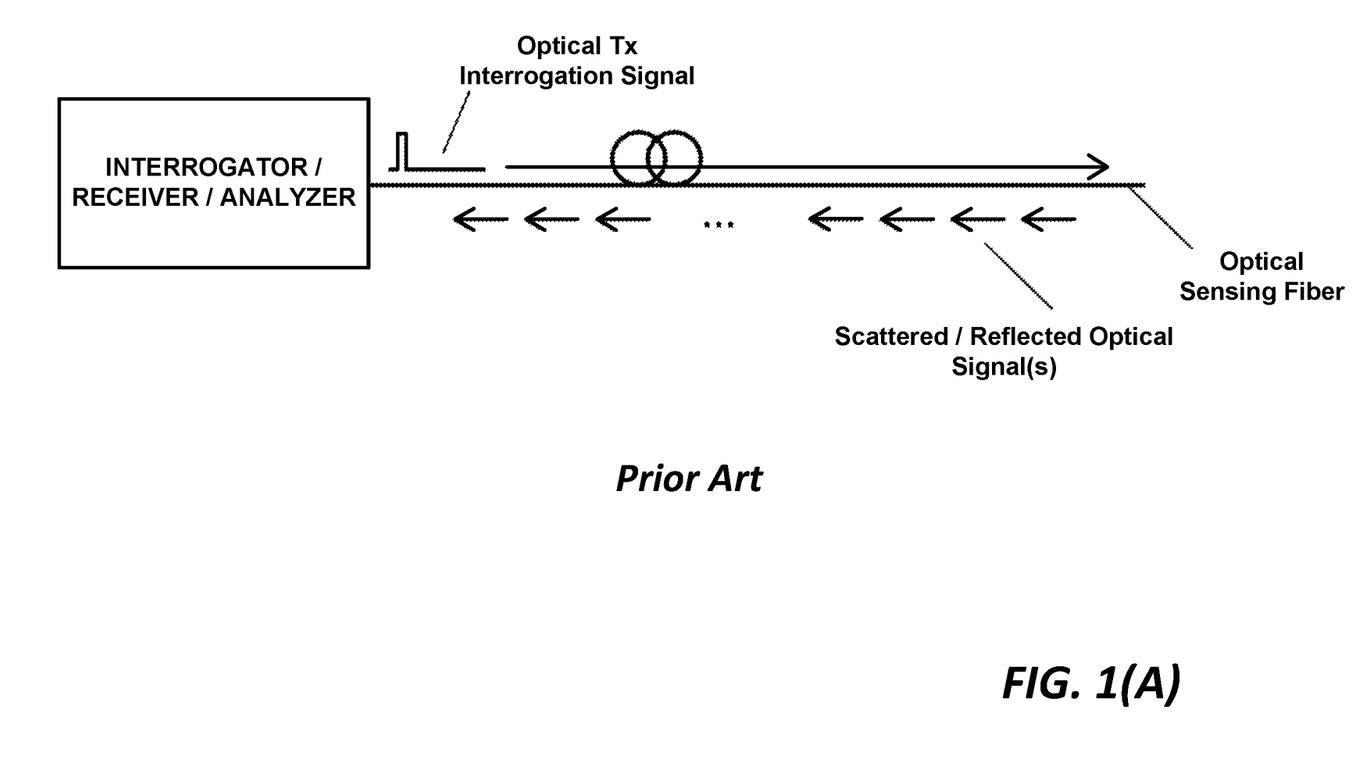
FIG. 1(A) and FIG. 1(B) are schematic diagrams showing an illustrative prior art uncoded and coded DFOS systems.
Figure 1B:
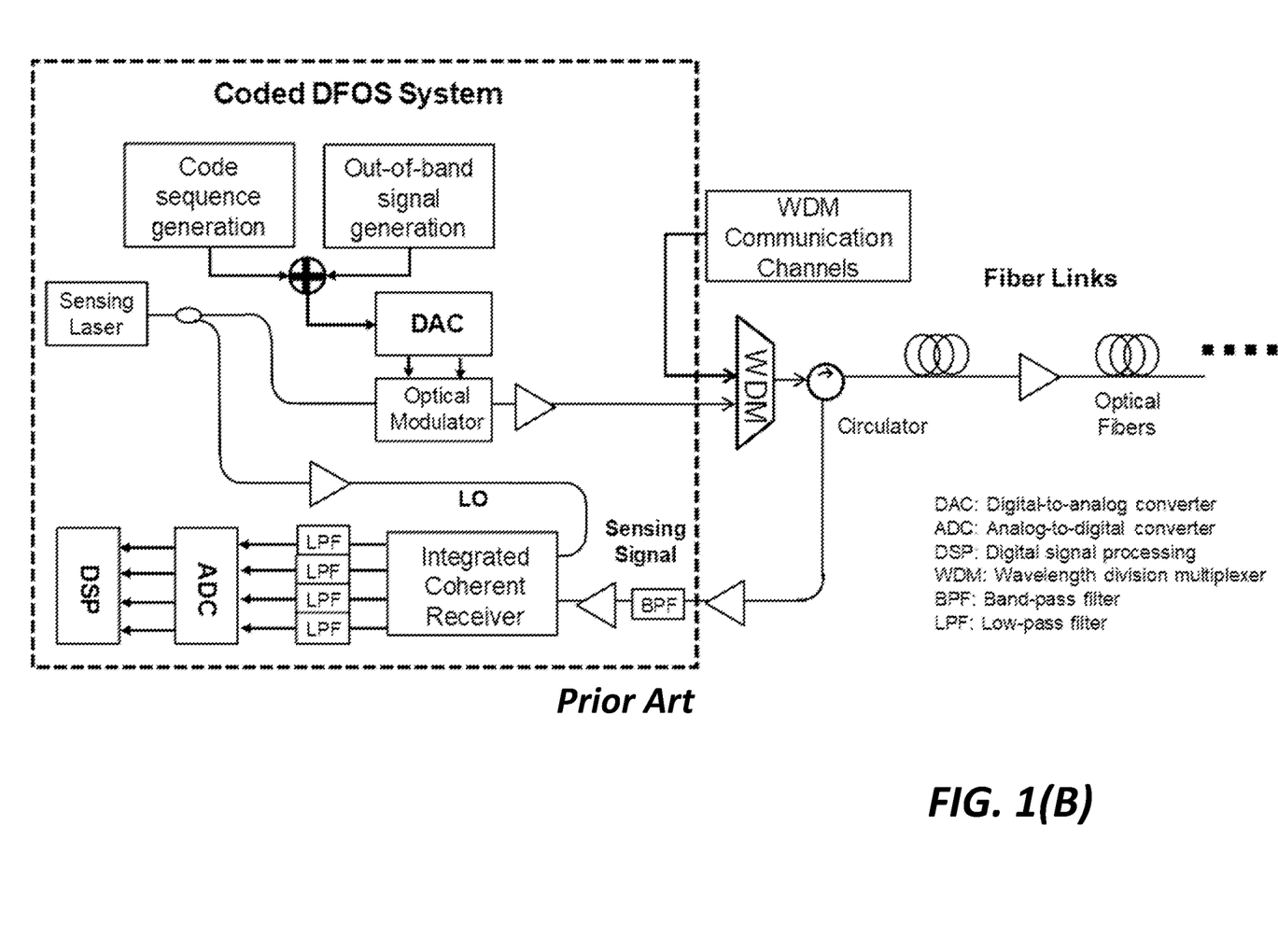

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back/forward to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

We note that this additional background is only show to introduce distributed acoustic sensing. When DAS techniques are sometimes employed, a receiver/interrogator is located at a far side of the transmitter-receiver configuration.

As we shall now further show and describe systems, methods, and structures according to aspects of the present disclosure.

Figure 2:
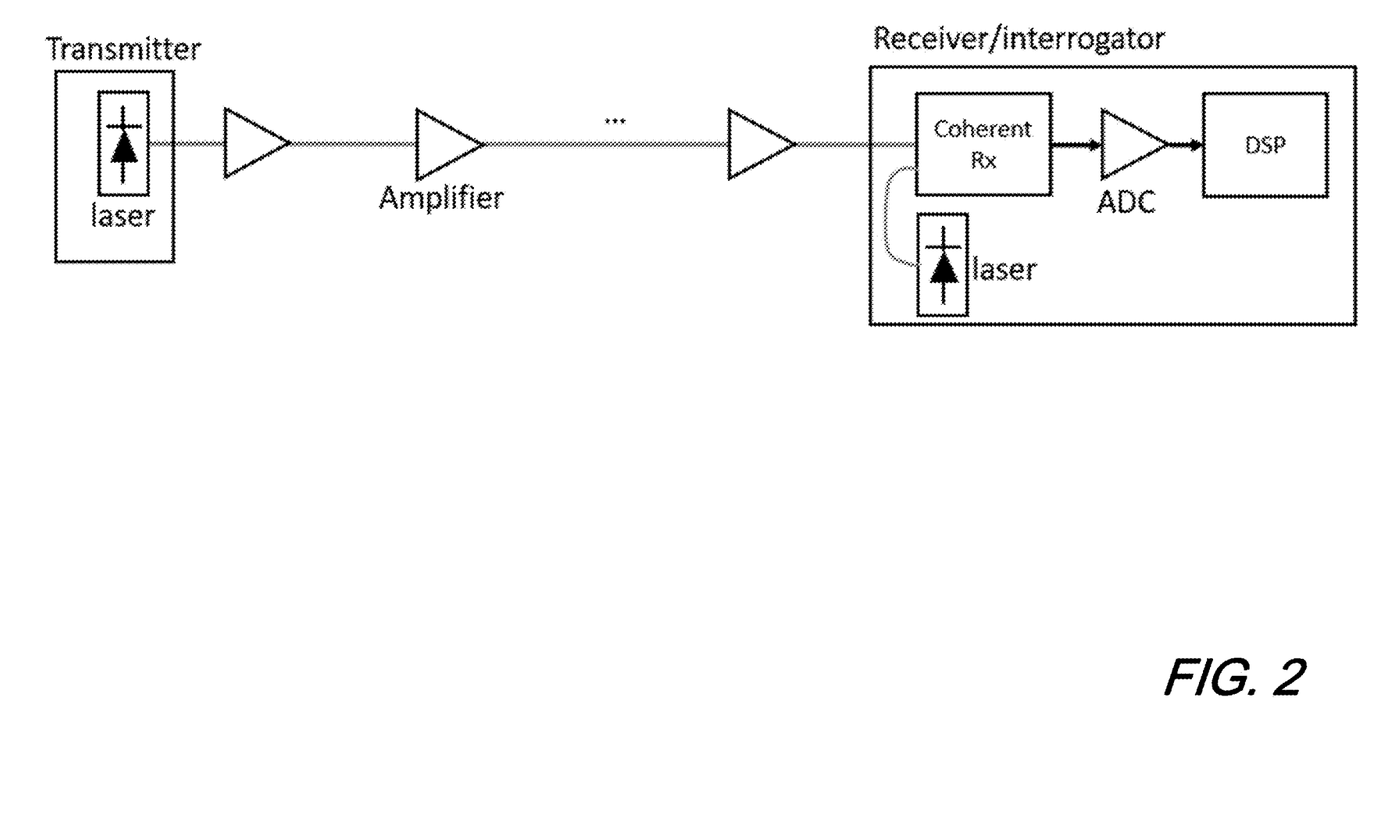
FIG. 2 is a schematic block diagram showing illustrative system architecture with CW laser on a Tx side and a CW laser feeding a coherent detector at a receiver/interrogator side according to aspects of the present disclosure.

FIG. 2 is a schematic block diagram showing illustrative system architecture with CW laser on a Tx side and a CW laser feeding a coherent detector at a receiver/interrogator side according to aspects of the present disclosure.

As illustratively shown, the transmitter launches an optical signal from a narrow linewidth laser into the fiber. Traversing the entire fiber length and the cascading amplifiers, the optical signal reaches the receiver/interrogator, which employs another narrow linewidth laser as LO (local oscillator) for coherent detection. The outputs from the coherent receiver, which include X and Y polarizations, each containing in-phase and quadrature as one complex signal ($X=x_i+j*x_q$, $Y=y_i+j*y_q$), are digitized by an Analog-To-Digital Converter (ADC) and further connected to a digital signal processor (DSP). The angle of the complex signal reflects the instant phase of the corresponding polarization, that carries the accumulated environmental information through the entire fiber over time. In actual application, to get the location with the detected activity, a bi-directional path is usually setup with transmitter and receiver on both ends.

Even though the two narrow linewidth lasers are initially tuned to generate the same wavelength, because of temperature, mechanical vibration, and other factors, each will have the frequency drifted independently, causing the signal inputted to the DSP spanning tens of Mega-Hertz (MHz) range. The frequency drifting is usually slow, in sub-Hertz to tens of Hertz level. This invention focuses on the DSP and the method to eliminate the laser frequency drift FIG. 3 is a schematic block diagram showing illustrative top level digital signal processor (DSP) circuitry that incudes polarization combining, a frequency drift tracking circuit (branch 1), and a phase extraction circuit (branch 2) according to aspects of the present disclosure.

Figure 4:
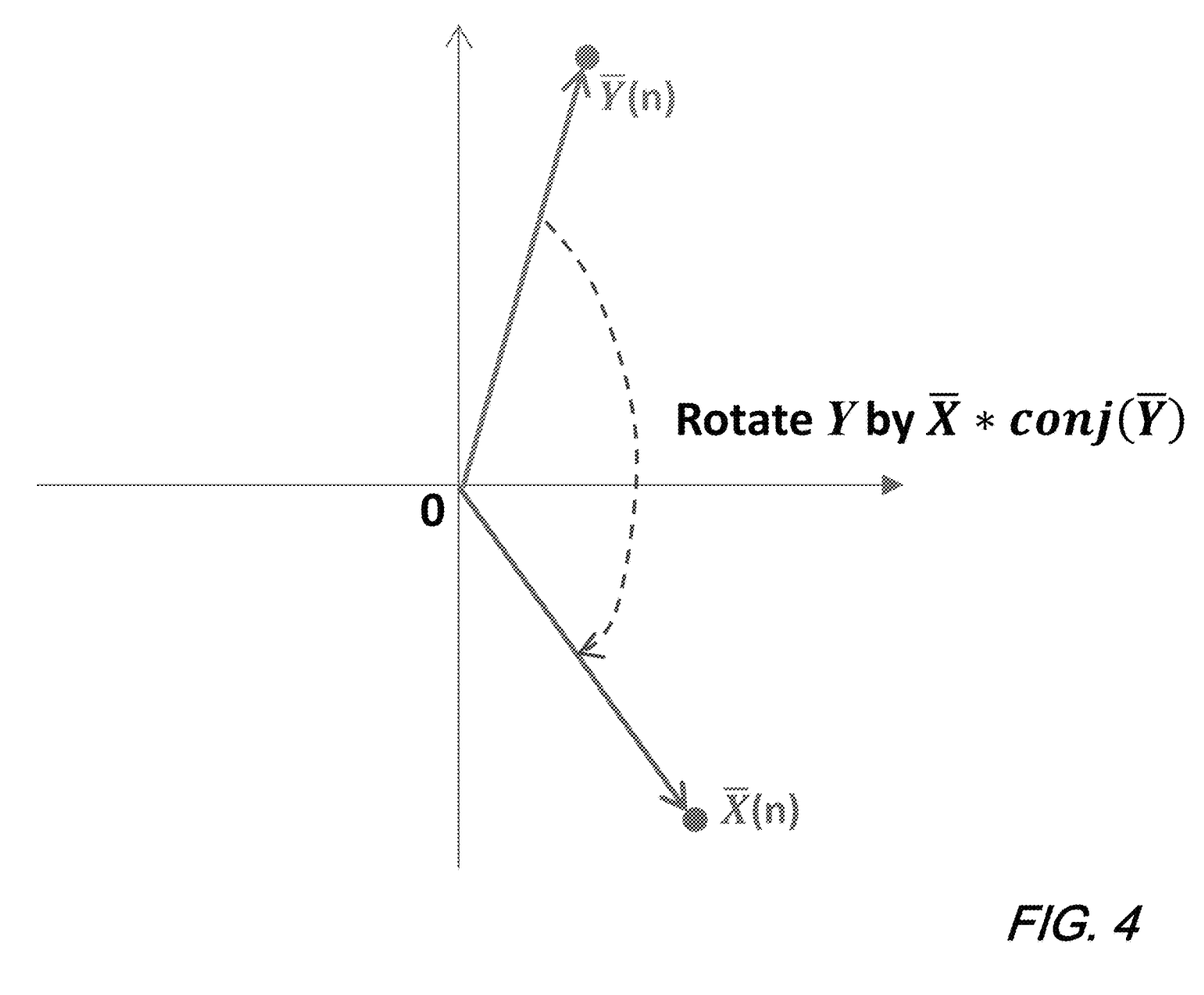
FIG. 4 is a schematic diagram showing illustrative complex signal rotation to align two polarizations to a same direction according to aspects of the present disclosure.

The X and Y polarizations from the ADC are first combined to a single signal, by rotating the polarization with less power to the higher power one. Use as the averaged signal from X, and from $\overline{Y}$ from Y, if average power $\overline{P_x} < \overline{P_y}$, then rotate signal Y by $Y_t = Y^* (\overline{X}^* conj(\overline{Y}))$, where $conj(\overline{Y})$ is the conjugate of $\overline{Y}$. This is illustrated in FIG. 4, which is a schematic diagram showing illustrative complex signal rotation to align two polarizations to a same direction according to aspects of the present disclosure.

In practical case, the power of the two polarizations may dynamically change, so we use the average of the "rotated signal" as reference, and rotate both to that direction, rather than using the instant average. If both polarizations have consistently high SNR, the above can be simplified by initially picking one polarization (say X), and always rotate the second one to have the same averaged direction.

Figure 3:
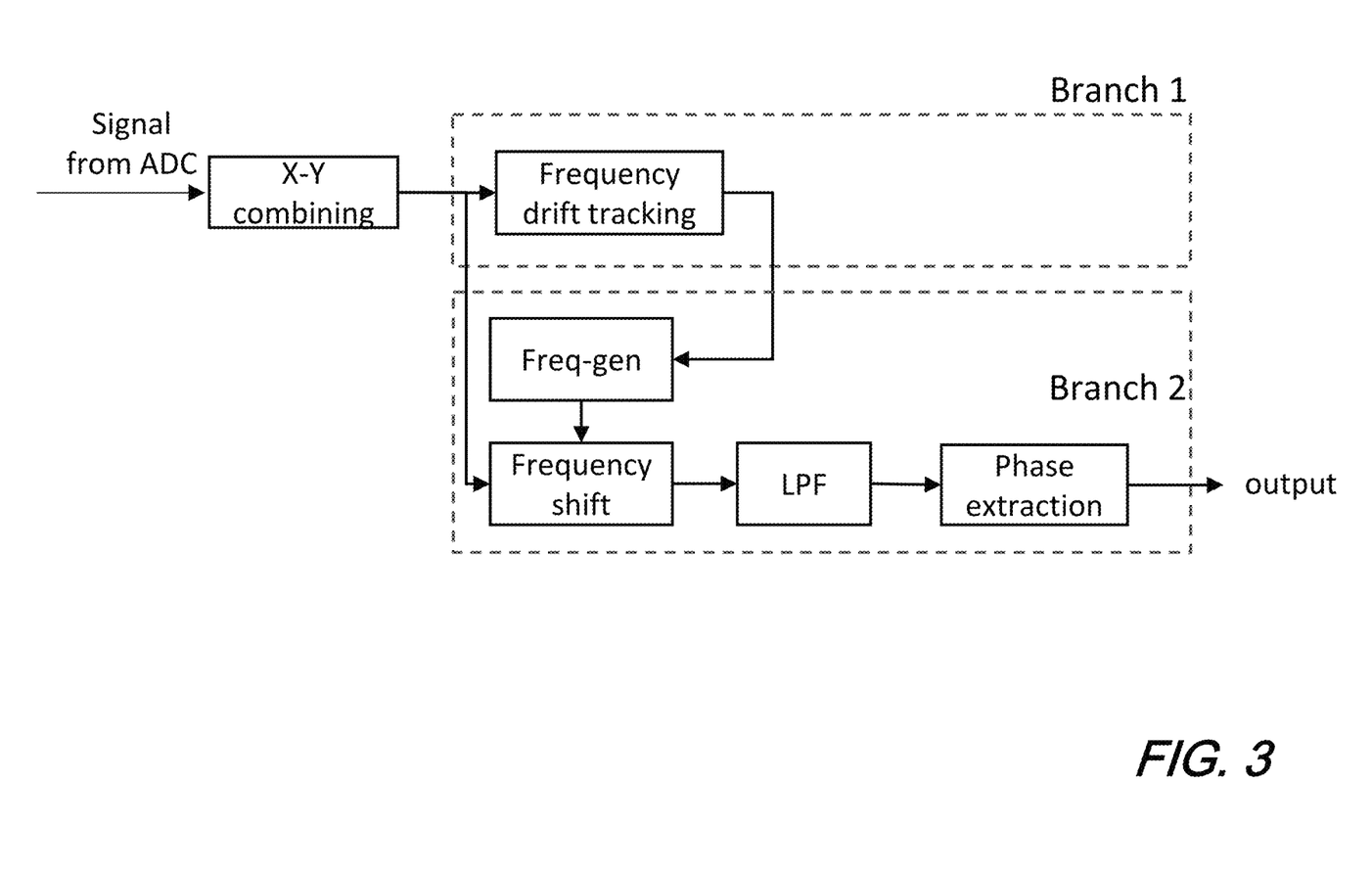
FIG. 3 is a schematic block diagram showing illustrative top level digital signal processor (DSP) circuitry that incudes polarization combining, a frequency drift tracking circuit (branch 1), and a phase extraction circuit (branch 2) according to aspects of the present disclosure.

The combined signal is first fed into a branch doing frequency drift tracking (branch 1 in FIG. 3). In one implementation, the frequency tracking includes a frequency shifter that converts the signal to lower frequency, such as close to DC range, followed by a low pass filter (LPF), after which a phase tracking is used to get the averaged phase difference between every two samples.

Figure 5:
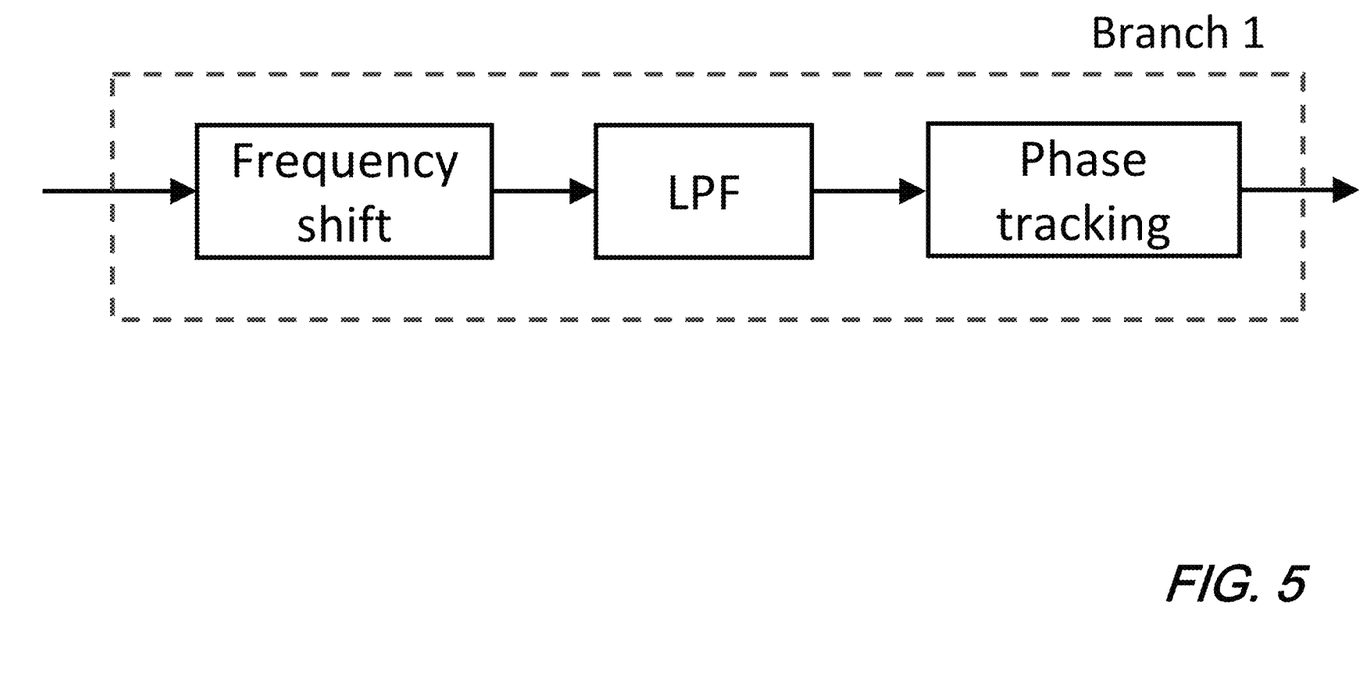
FIG. 5 is a schematic diagram showing illustrative frequency drift tracking in branch 1 of FIG. 3 according to aspects of the present disclosure.

FIG. 5 is a schematic diagram showing illustrative frequency drift tracking in branch 1 of FIG. 3 according to aspects of the present disclosure.

Figure 6:
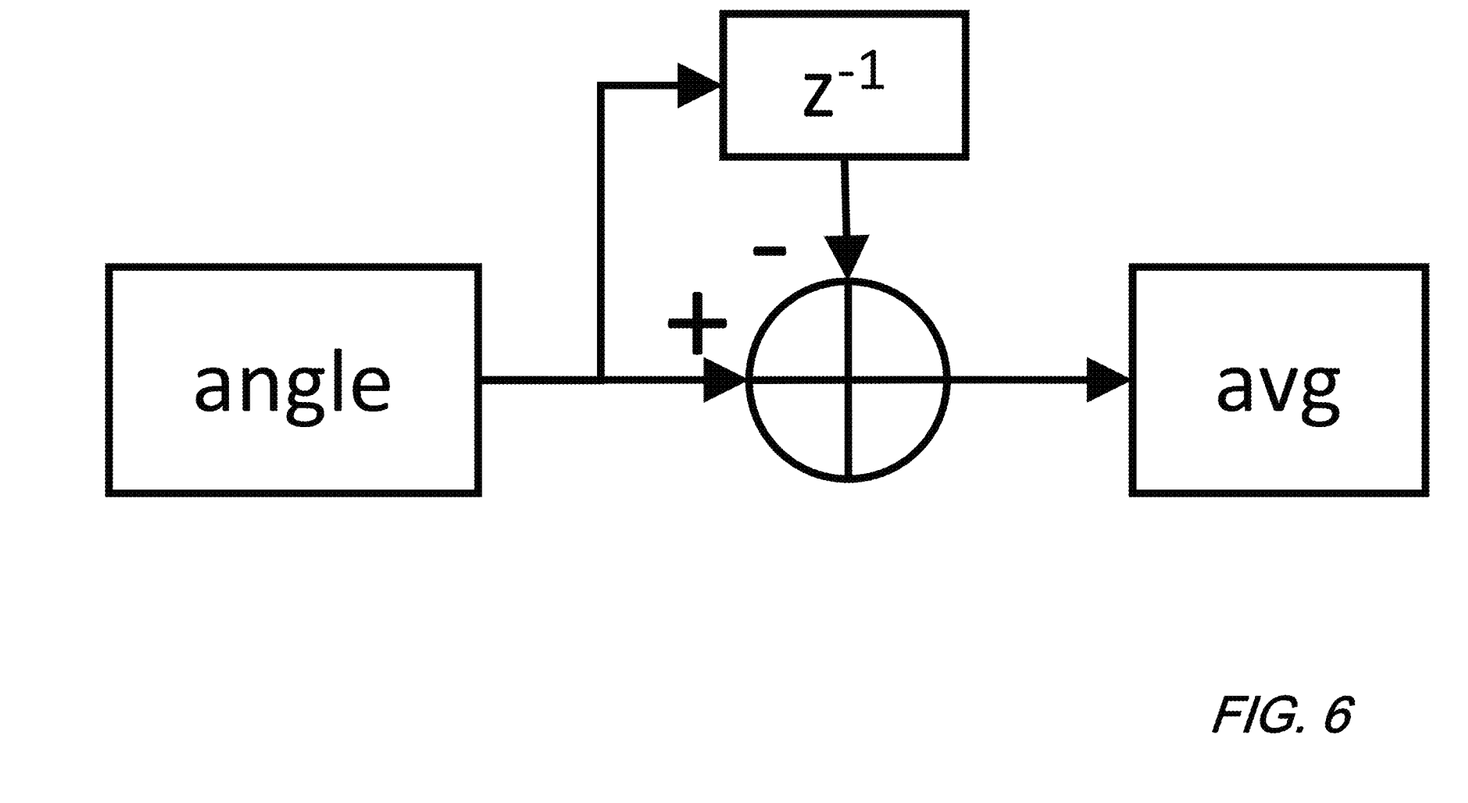
FIG. 6 is a schematic diagram showing illustrative phase tracking circuitry according to aspects of the present disclosure.

FIG. 6 is a schematic diagram showing illustrative phase tracking circuitry according to aspects of the present disclosure.

Figure 7:
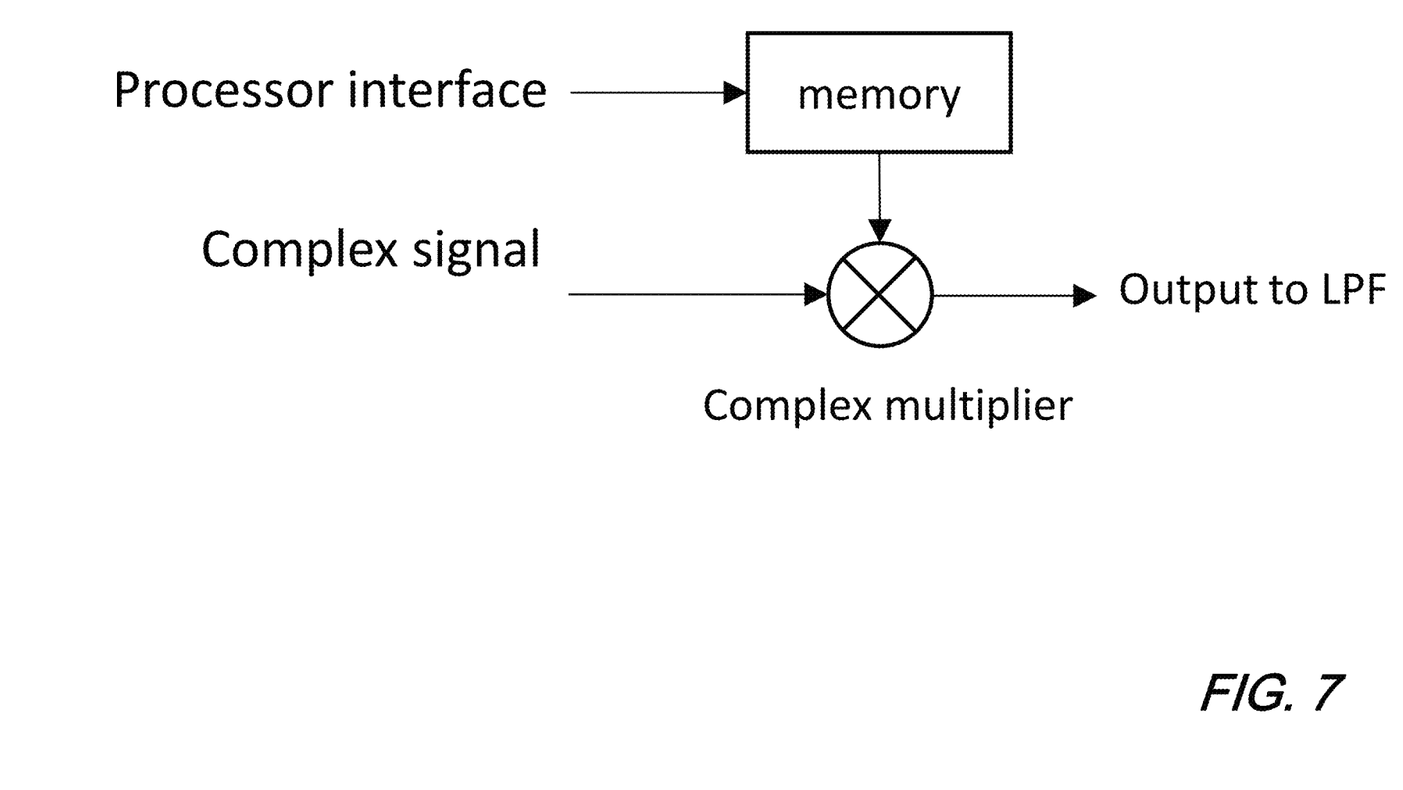
FIG. 7 is a schematic diagram showing illustrative circuit for frequency shifter of branch 1 in FIG. 5 according to aspects of the present disclosure.

The phase tracking circuitry as shown in FIG. 6, first converts the complex signal to an angle, then calculates the phase difference between every two samples, and converts to $(-\pi, +\pi]$ range. The phase differences are averaged with the result fed into branch 2. In one implementation, the frequency shifter uses pre-set coefficient from a memory, to multiply the input signal using a complex multiplier, as shown in FIG. 7 is a schematic diagram showing illustrative circuit for frequency shifter of branch 1 in FIG. 5 according to aspects of the present disclosure.

The coefficients in the memory have phase steps of $2\pi f/S$ where f is the frequency to shift, and S is the ADC sampling rate. Frequency f can use max (gcd(S,f)), where "gcd" is "greatest common divisor", while $|f-f_0|$ is low enough to be within allowable phase tracking range, to reduce the memory usage.

Figure 8:
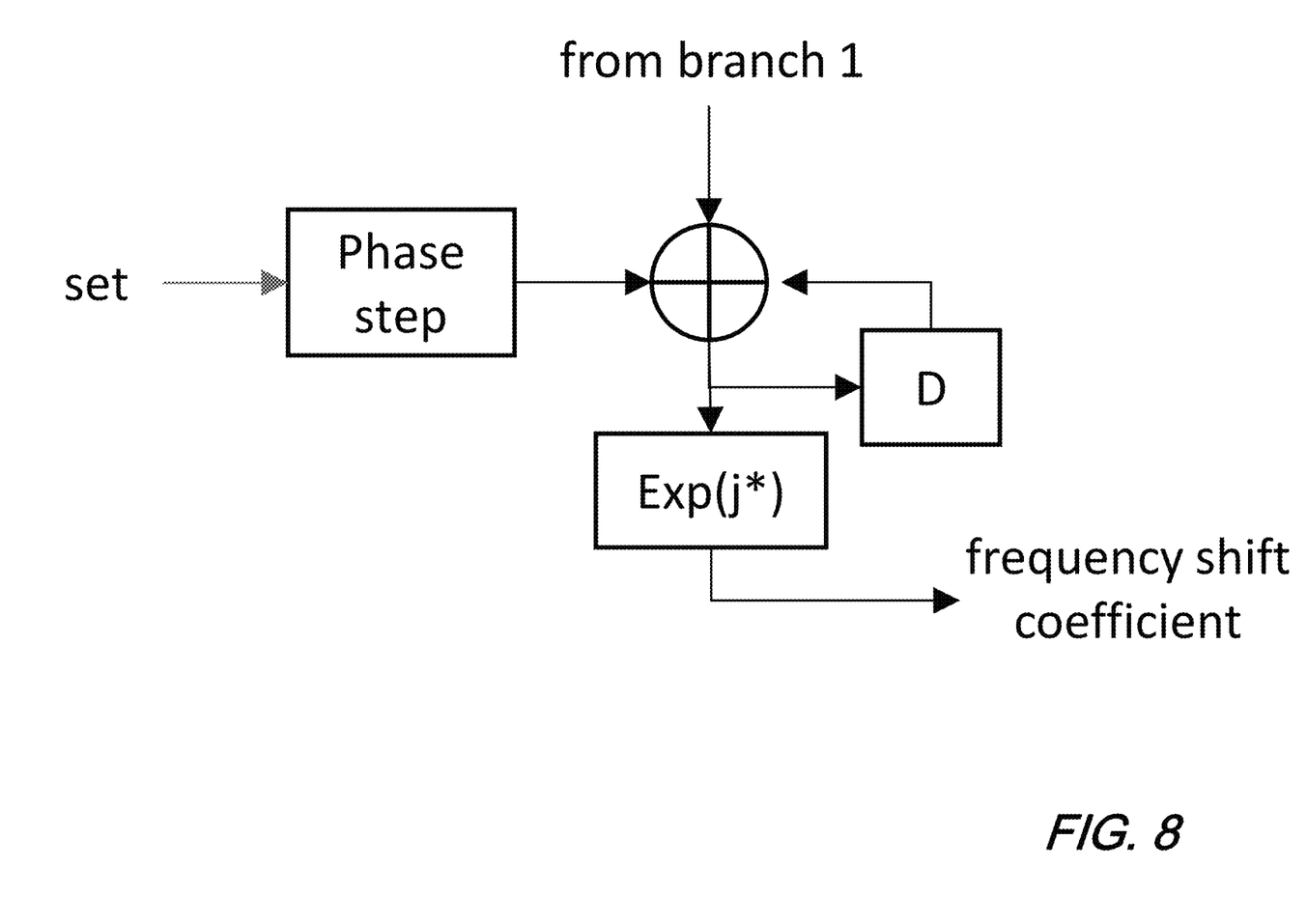
FIG. 8 is a schematic circuit for frequency generation in branch 2 of FIG. 3 according to aspects of the present disclosure.

FIG. 8 is a schematic circuit for frequency generation in branch 2 of FIG. 3 according to aspects of the present disclosure. As shown in FIG. 8, output from branch 1 is connected to a frequency generator in branch 2, to generate the frequency that contains both the fixed offset and the laser frequency drift. The output from the frequency shifter reflects the sensing result from the environment of the entire fiber path, without laser drift. A low pass filter (LPF) removes high frequency noise and keeps the acoustic frequency only. Finally, a phase extractor gets the phase information, which is linear to the environmental disturbance.

FIG. 8 shows the circuit to generate the frequency shift coefficient for branch 2. The sum of a fixed setting ("phase step" in the figure) from a processor interface, and the averaged value from branch 1, are connected to an accumulator, which is further connected to a function generator exp(j*<input>), where <input> is the accumulator output. The function generator is implemented using CORDIC (coordinate rotational digital computer) algorithm, to have cos(<input>) and sin(<input>).

Figure 9:
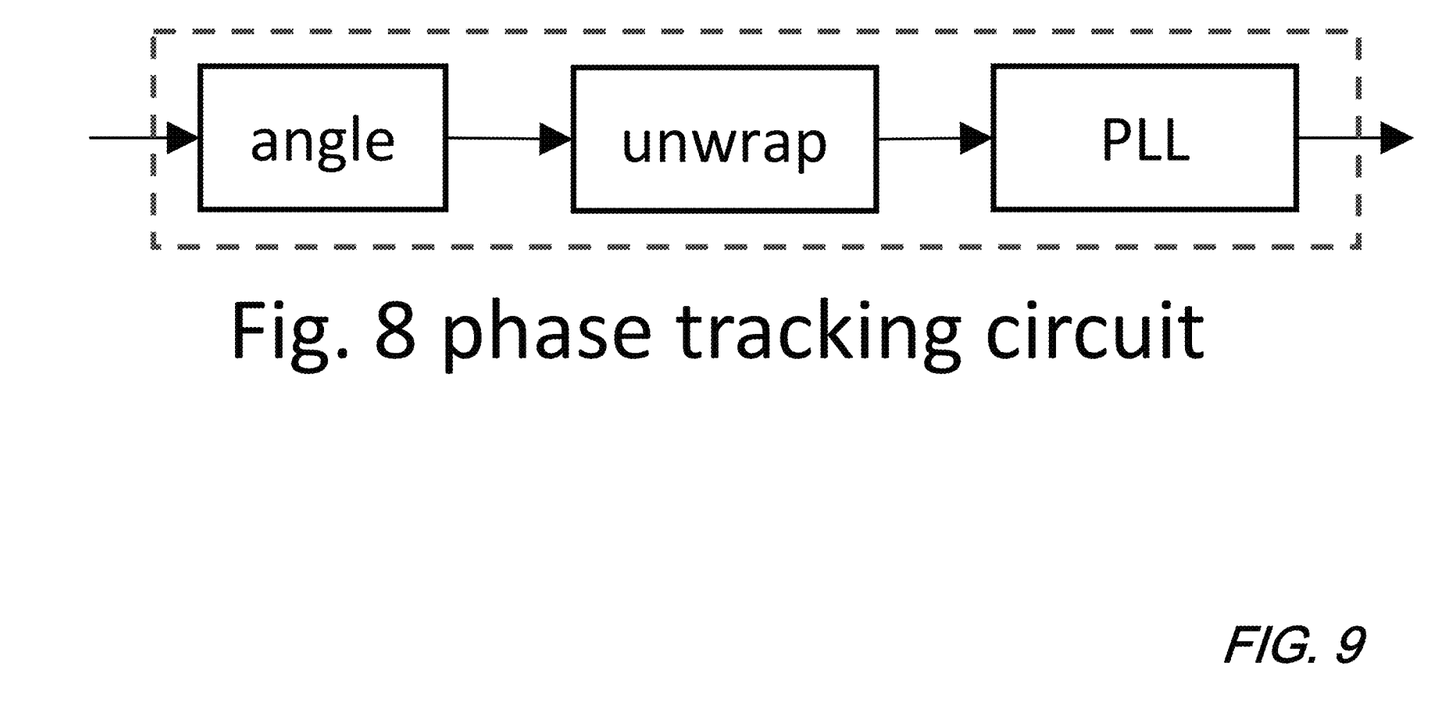
FIG. 9 is a schematic circuit for phase extraction according to aspects of the present disclosure.

To reduce the processing complexity, the input to the phase extractor is down sampled to lower sampling rate, that covers the Nyquist band of the acoustic signal. One implementation of the architecture of the phase extractor is shown in FIG. 9, which is a schematic circuit for phase extraction according to aspects of the present disclosure.

First the angle of the complex signal is calculated, followed by a unwrapping module to limit the phase difference of every two samples within $(-\pi, +\pi]$ range. The unwrapped phase is connected to a phase locked loop (PLL) to have the acoustic signal output. Alternatively, the PLL can be implemented using a low-pass filter.

As we have described, an optical signal input to a receiver side interrogator is CW light that carries the disturbance along the entire fiber. This signal is coherently detected using a local narrow linewidth laser, to produce two polarizations' complex output.

The two polarizations are first combined by rotating to the same direction.

The polarization combined complex signal uses a first branch that tracks the laser's frequency difference and the drift. It uses a frequency shifter to move the signal close to DC, then calculates the angle of each sample. After that, it calculates the phase difference between every two samples.

The phase differences are averaged and updated in real-time to reflect the frequency drift. The averaged value is outputted to the second branch.

The second branch uses a pre-set fixed step and the input from branch 1, as the input to an accumulator. The accumulator generates the phase signal which is further converted to a complex signal and used as the frequency shifting coefficient for each input sample. The multiplication result of the input signal and the dynamic coefficient removes the frequency drift. Then a phase extraction module calculates the real-time phase information, which reflects the detected environmental activity.

As we have previously discussed, FIG. 1 shows an illustrative system architecture that the current invention is applied to. The transmitter launches the optical signal from a narrow linewidth laser into the fiber. Going through the entire fiber and the cascading amplifiers, the signal reaches the receiver/interrogator, which uses another narrow linewidth laser as LO (local oscillator) for coherent detection. The outputs from the coherent receiver, which include X and Y polarizations, each containing in-phase and quadrature as one complex signal $(X=x_i+j^*x_q, Y=y_i+j^*y_q)$, are digitized by an ADC and further connected to a digital signal processor. The angle of the complex signal reflects the instant phase of the corresponding polarization, that carries the accumulated environmental information through the entire fiber over time.

Figure 10:
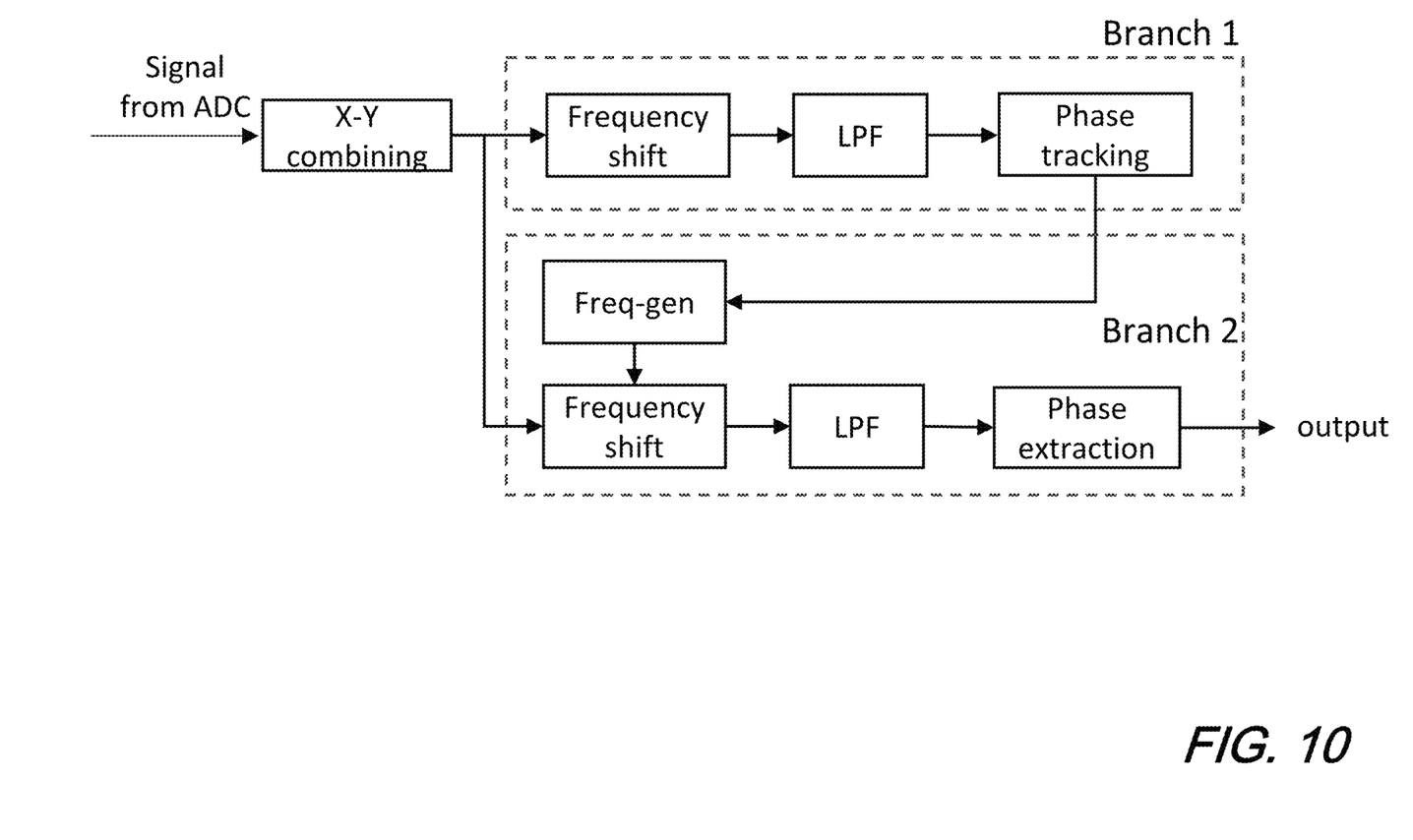
FIG. 10 is a schematic diagram showing alternative illustrative arrangement for DSP according to aspects of the present disclosure.

As shown illustratively in FIG. 10 is an alternative illustrative configuration in which a frequency drift tracking branch that runs parallel with the phase extraction branch. In this architectural arrangement illustratively shown, it includes a "branch 1" for this added feature to estimate the frequency drift. The estimated value is presented in "updated phase step" that reflects the residual frequency offset from the fixed "frequency shift" element. This estimated value is sent to a second branch (branch 2 in FIG. 10), to generate the dynamic frequency shift coefficients, so that the laser frequency drift can be eliminated. Here the frequency tracking function in branch 1 and the dynamic frequency generator in branch 2 are the modifications needed.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for laser frequency drift compensation in forward distributed acoustic sensing, the method comprising:
   receiving an optical signal by a coherent optical receiver;
   coherently detecting the optical signal such that a complex output having two polarizations X and Y, are produced;
   performing frequency drift tracking on the complex output;
   performing phase extraction on the frequency drift tracked complex output;
   wherein the optical signal is a distributed fiber optic sensing optical signal.

2. The method of claim 1 wherein the phase extraction determines real-time phase information that is indicative of detected environmental activity.

3. The method of claim 2 further comprising combining the two polarizations by rotating to a same direction.

4. The method of claim 3 wherein the frequency drift tracking tracks a frequency difference and drift of a first laser that produced the optical signal.

5. The method of claim 4 wherein the frequency drift tracking determines a phase difference between every two samples and averages to determine frequency drift.

* * * * *